United States Patent
Griffin et al.

(10) Patent No.: US 8,803,850 B2
(45) Date of Patent: Aug. 12, 2014

(54) STYLUS WITH CONTROL RING USER INTERFACE

(75) Inventors: Jason Tyler Griffin, Kitchener (CA); Tracy Christina Sharp, London (GB); Mario Duarte Rodrigues Siqueira, London (GB)

(73) Assignee: BlackBerry Limited, Waterloo (CA)

( * ) Notice: Subject to any disclaimer, the term of this patent is extended or adjusted under 35 U.S.C. 154(b) by 168 days.

(21) Appl. No.: 13/524,176

(22) Filed: Jun. 15, 2012

(65) Prior Publication Data

US 2013/0335380 A1    Dec. 19, 2013

(51) Int. Cl.
*G06F 3/033* (2013.01)
*G06F 3/041* (2006.01)
*G06K 11/06* (2006.01)
*G08C 21/00* (2006.01)

(52) U.S. Cl.
USPC .................. 345/179; 345/184; 178/19.01

(58) Field of Classification Search
CPC ............... G06F 3/03545; G06F 3/0383
See application file for complete search history.

(56) References Cited

U.S. PATENT DOCUMENTS

| | | | |
|---|---|---|---|
| 5,349,139 A * | 9/1994 | Verrier et al. | 178/19.04 |
| 5,629,500 A * | 5/1997 | Fukuzaki et al. | 178/19.07 |
| 5,661,269 A | 8/1997 | Fukuzaki et al. | |
| 6,259,438 B1 * | 7/2001 | Fleck et al. | 345/184 |
| 6,474,888 B1 | 11/2002 | Lapstun et al. | |
| 7,123,244 B2 | 10/2006 | Lui | |
| 2003/0223381 A1 * | 12/2003 | Schroderus | 370/285 |
| 2007/0188477 A1 | 8/2007 | Rehm | |
| 2008/0169132 A1 * | 7/2008 | Ding et al. | 178/19.02 |
| 2008/0238887 A1 | 10/2008 | Love | |
| 2009/0135149 A1 | 5/2009 | Taniuchi | |
| 2009/0141046 A1 * | 6/2009 | Rathnam et al. | 345/661 |
| 2009/0146975 A1 * | 6/2009 | Chang | 345/179 |
| 2011/0007037 A1 * | 1/2011 | Ogawa | 345/179 |
| 2011/0141067 A1 | 6/2011 | Misawa et al. | |
| 2011/0164001 A1 | 7/2011 | Seo et al. | |

FOREIGN PATENT DOCUMENTS

JP    2011 145763    7/2011

OTHER PUBLICATIONS

European Search Report, EP12172299.5, Oct. 11, 2012.

* cited by examiner

*Primary Examiner* — Alexander S Beck
*Assistant Examiner* — Brent Castiaux

(57) ABSTRACT

Control rings are mounted on a stylus body. A controller within the stylus body generates a control signal dependent upon the control rings. The control signal is transmitted to a host electronic device where information contained in the control signal is used to control properties of a drawing tool in a computer drawing application.

21 Claims, 4 Drawing Sheets

STYLUS WITH CONTROL RING USER INTERFACE

BACKGROUND

Stylus pointing devices are used to convey position information to a host electronic device. However, unlike a computer mouse that conveys relative motion, a stylus is designed to convey the absolute position of the stylus pen on a surface such as a tablet or screen. The position may be determined by a variety of methods, including detecting the interaction of the stylus with the electrical properties of the tablet (electromagnetic induction, electrical resistance, electrical capacitance), the optical properties of the tablet, or by ultrasonic location.

An active stylus has an ability to communicate with the host electronic device over a wired link or over a wireless communication link, such as a Radio-Frequency (RF) or Infrared (IR) link.

A stylus may be used in conjunction with a graphical user interface to enable user input to the host electronic device.

A common use of a stylus is to provide user input to a computer drawing or handwriting application. In this application the stylus is used both to draw lines and to interact with a user interface. For example, selection of the properties of the line is achieved by using a stylus to interact with a graphical user interface. Properties of a line to be drawn, such as the color or thickness of the line, may be selected by touching ('clicking') the stylus to a particular region of the screen or tablet. Alternatively, the color or thickness of a line may be selected by using the stylus to move a screen cursor to a particular region of the screen. A similar approach is used to select other properties of the line to be drawn.

It would be useful to provide a faster and more intuitive method for selecting drawing tools, line properties, or other parameters.

BRIEF DESCRIPTION OF THE DRAWINGS

Example embodiments of the present disclosure will be described below with reference to the included drawings such that like reference numerals refer to like elements and in which.

DETAILED DESCRIPTION

Figure 1:
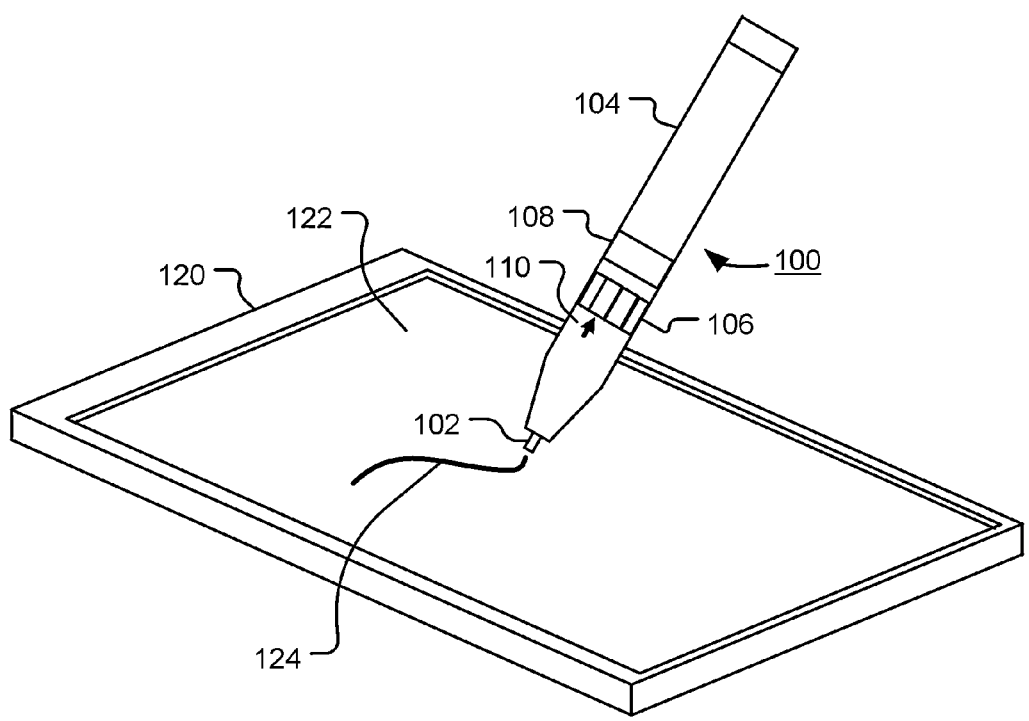
FIG. 1 is a block diagram of a drawing system, in accordance with various example embodiments of the present disclosure.

For simplicity and clarity of illustration, reference numerals may be repeated among the figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein.

One aspect of the present disclosure relates to a drawing system that uses a stylus to provide user input to an electronic device. A first control signal is generated in response to user manipulation of a first control ring on the stylus. This first control signal is configured to control a first drawing tool property on the electronic device. A second control signal is generated in response to user manipulation of a second control ring on the stylus. This second control signal is configured to control a first drawing tool property of a drawing application run on the electronic device. The first and second control signals are multiplexed to form a transmission signal that is transmitted from a transmitter of the stylus. The transmission signal is received by a host electronic device, such as a tablet, pad, etc., and used to control operation of an application being executed on the device.

FIG. 1 is a block diagram of a drawing system, in accordance with various example embodiments of the present disclosure. The drawing system includes a stylus 100 having a drawing tip 102, a body 104, a first control ring 106 and a second control ring 108. In one embodiment, the control ring 106 is a selection switch that is rotatable about the stylus body. A marker 110, on the stylus body, may be used to indicate the position of the control ring 106. The stylus 100 also includes a radio frequency (RF) or infrared (IR) transmitter to enable communication between the stylus and a host electronic device 120. The host electronic device 120 has a display screen 122. The host electronic device 120 also includes a receiver and a processor that is operable to execute a program of instructions of a computer drawing application.

In operation, the stylus 100 transmits a communication signal to the host electronic device 120. The communication signal is dependent upon user interaction with the first and second control rings of the stylus. The host electronic device 120 is operable to receive the communication signal and use it to set properties of a drawing tool in the drawing application. In particular, the communication signal may be used to control the properties of a line or image 124 displayed on the display screen 122, or to select a drawing tool to be used.

In one embodiment, the first control ring 106 is a color ring that is used to set a drawing tool color. In this embodiment, the control ring 106 is rotatable with respect to the stylus body 104. The drawing tool color is selected dependent upon the angular position of the color ring relative to the body of the stylus.

In a further embodiment, the second control ring is a capacitive ring and the communication signal is dependent upon a touch position on the capacitive ring, or a touch motion on the capacitive ring. The capacitive ring provides substantially continuous control of the value of a selected drawing tool property. However, in practice the value may be quantized for communication as a digital value. For example, the value may be quantized using between 7 and 16 bits. Coarser or finer quantization may be used.

Figure 2:
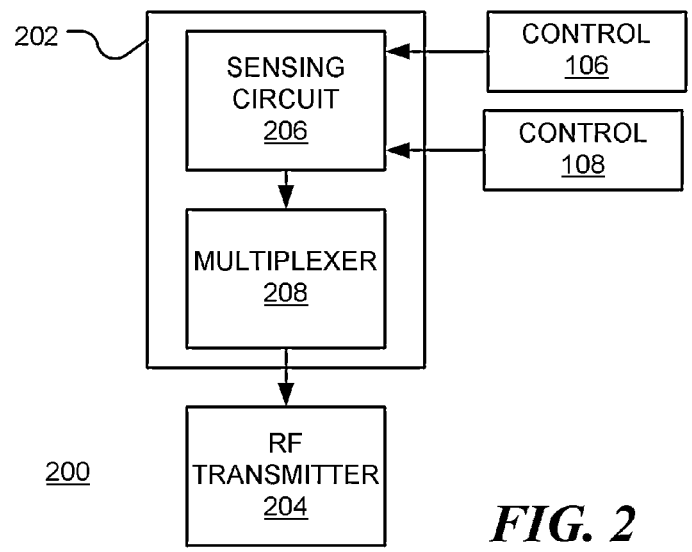
FIG. 2 is a block diagram of a stylus circuit, in accordance with various example embodiments of the present disclosure.

FIG. 2 is a block diagram of a stylus circuit, in accordance with various example embodiments of the present disclosure. The stylus circuit 200 includes a control circuit 202 and a transmitter 204. The control circuit has a sensing circuit 206, which is responsive to the first and second control rings, 106 and 108. In one embodiment, one or more of the control rings 106 and 108 is a selection switch and the sensing circuit 206 detects the angular position of the switch. The angular position of the switch may be used to select a discrete identifier, such as a drawing tool type (brush or pen) or a drawing tool property identifier (color or line width), or a combination of type and properties (such as a blue pen), on a host electronic device. In a further embodiment, a control ring is a continuous sensor, such as a capacitive ring, resistive ring, rotary potentiometer, or analog sensor. The sensing circuit 206 detects the user interaction with the control ring. This may be used to select the value of a property (such as the width of a line, the size of an image, the amount of red component in the color, etc) of a drawing tool on a host electronic device.

The embodiment described above has two control rings. However, the stylus may have three or more control rings. A ring may be used for discrete selection or continuous value input.

In one embodiment, a first control ring is used to select a drawing tool property and one or second control rings are used to set a value of the selected property.

Referring again to FIG. 2, the sensed property and the sensed property value are multiplexed in multiplexer 208 of the control circuit 202 to form a control signal. The control signal is formed in accordance with a communication protocol, such that it may be interpreted by a host electronic device. The control signal is passed to the transmitter 204 for transmission to a host electronic device. The transmitter may be an RF transmitter, for example, that operates using a known protocol, such as Bluetooth, WiFi, or near field communication (NFC). Alternatively, the transmitter 204 may use a custom protocol.

Alternative wireless communication techniques may be used without departing from the teachings presented herein. Such techniques include optical, infrared (IR) and ultrasonic techniques.

Figure 3:
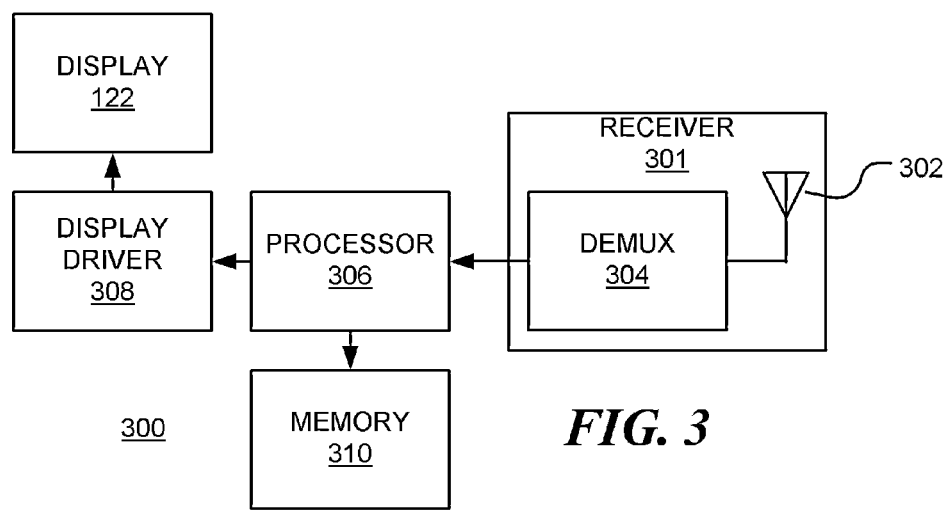
FIG. 3 is a block diagram of a circuit of a host electronic device, in accordance with various example embodiments of the present disclosure.

FIG. 3 is a block diagram of a circuit 300 of a host electronic device, in accordance with various example embodiments of the present disclosure. The circuit 300 has an antenna 302 that receives the RF transmission from a stylus, and a demultiplexer 304 of receiver 301 that recovers the control signal from the RF signal. The control signal is input to a processor 306, where the information contained in the control signal is used to control operation of a computer drawing application, or other program, executed on the processor. The output from the processor 306, which may be an electronic drawing for example, is passed to a display driver 308 and then rendered on a display 122 of the host electronic device. The output may also be stored in a memory 310. The memory may be local to the electronic device, remote from the electronic device, or a combination thereof.

Figure 4:
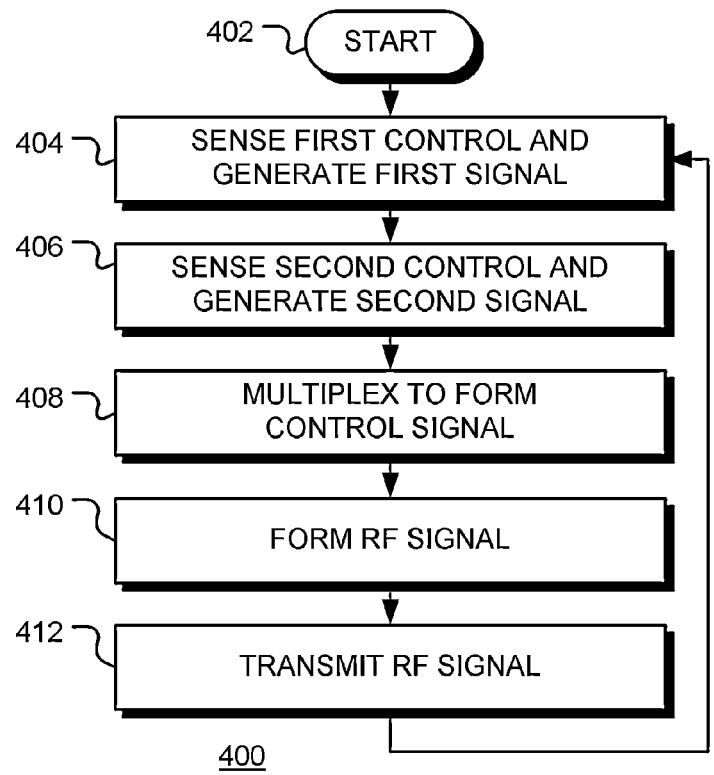
FIG. 4 is a flow chart of a method for providing user input to an electronic device from a stylus, in accordance with various example embodiments of the present disclosure.

FIG. 4 is a flow chart 400 of a method for providing user input to an electronic device from a stylus, in accordance with various example embodiments of the present disclosure. The method begins at start block 402 in FIG. 4. At block 404, a first control ring of the stylus is sensed and a first signal is generated dependent upon and in response to user activation of the first control ring on the stylus. The first signal may be used, for example, to select a first drawing tool type, property or combination thereof, on the host electronic device. At block 406, a second control ring of the stylus is sensed and a second signal is generated dependent upon and in response to user activation of the second control ring on the stylus. The second signal may be used, for example, to select a value of a drawing tool property on the host electronic device. At block 408, the first and second signals are multiplexed to form a control signal. The control signal may specify one or more identifiers, such as the type of drawing tool or an attribute of a tool, and a drawing tool parameter value. Example properties and their associated parameters will be discussed below.

At block 410, the control signal is embedded in a transmission signal, which is then transmitted, as an RF signal for example, to the host electronic device at block 412. Flow then returns to block 404.

Figure 5:
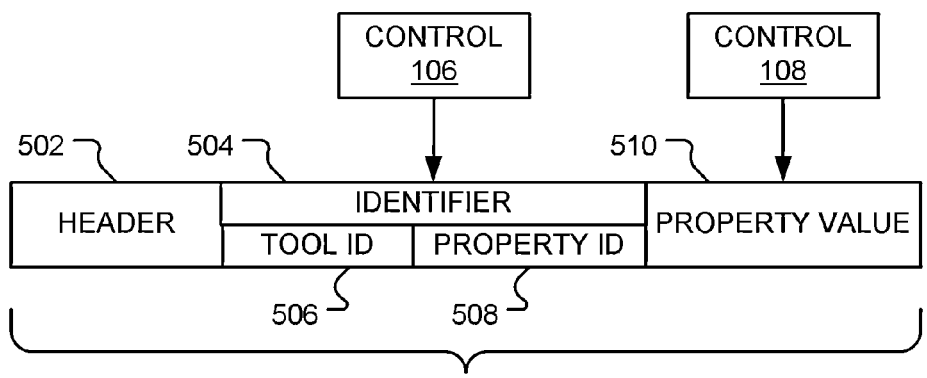
FIG. 5 is a diagram of a control signal, in accordance with various example embodiments of the present disclosure.

FIG. 5 is a diagram of a control signal, in accordance with various example embodiments of the present disclosure. In this example, the control signal 500 has a header 502, which may contain information such as a stylus identification number, the format of the control signal, the length of the control signal, and a checksum. The control signal also has an identifier field 504 that identifies a property to be controlled. The identifier field may include a tool type identifier 506 (pen, brush, etc) a property identifier 508 (such as color, line width, size, etc). The control signal also includes a property value 510. Either the tool type identifier 506 or the property identifier 508 may be determined by the first control ring 106, with the other identifier may be fixed or selectable by some other means (such as communication with the host electronic device). The property value 510 is determined by the second control ring 108, which may be a substantially continuous controller. An additional first control ring may be used to enable control of both tool type 506 and property to be controlled 508. Other control signal formats may be used without departing from the present disclosure.

In one embodiment, the identifier in field ID 504 is a numerical representation of the angular position of the first control ring and the property value 510 is a numerical representation of the second control value. Interpretation of the numerical representations is performed by the host electronic device and may be customizable through a user interface, such as a menu, of the host electronic device.

FIG. 6, FIG. 7, FIG. 8 and FIG. 9 are diagrams of styli with control ring user interfaces, in accordance with various example embodiments of the present disclosure.

Figure 6:
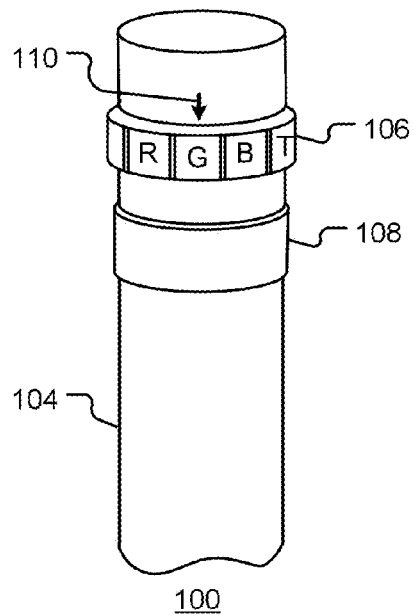
FIGS. 6-9 are diagrams of styli with control ring user interfaces, in accordance with various example embodiments of the present disclosure.

FIG. 6 shows a substantially cylindrical section of a stylus body 104 having two control rings. In this example, control ring 106 is a selector ring and control ring 108 is a substantially continuous control ring, such as a capacitive band for example. Selector ring 106 is used to select between various attributes of a drawing tool property. Here the letters 'R', 'G' and 'B' on the control ring 106 indicate a color component to be adjusted (red, green or blue) and the letter 'T' denotes that the line thickness is to be adjusted. In practice, the color component may be indicated by the actual color rather than by a letter, and the line thickness or other attribute may be indicated by a graphical symbol or a letter. A marker 110 indicates which attribute has been selected for control. In the example shown, the green component has been selected, as indicated by the alignment of the letter 'G' with the marker 110, so user interaction with the second control ring 108 will cause adjustment of the green component of the color being used in the drawing application on the host electronic device. In this example a single selection ring 106 is used, so the color change might be applied to a drawing tool currently in use.

Figure 7:
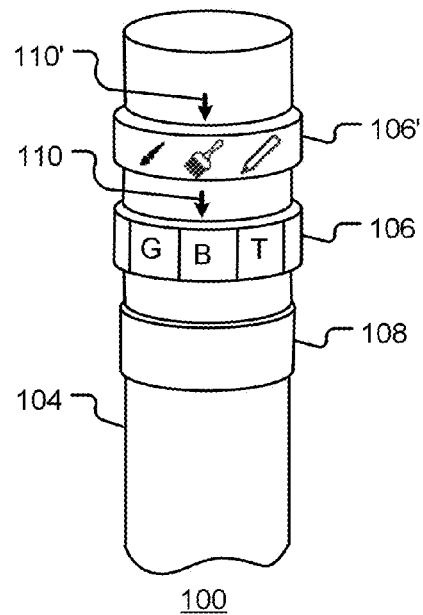

FIG. 7 shows a section of a stylus body 104 having three control rings. Control rings 106 and 108 operate as described above in reference to FIG. 6. The second selection ring 106' is used to select which drawing tool is to be used in the drawing application. In this example, control ring 106' is rotated to select a brush drawing tool since the brush symbol is aligned with the marker 110'. The control ring 106 is rotated to select the blue component of the color, aligned with marker 110, so the control ring 108 controls the blue component of the brush color.

Figure 8:
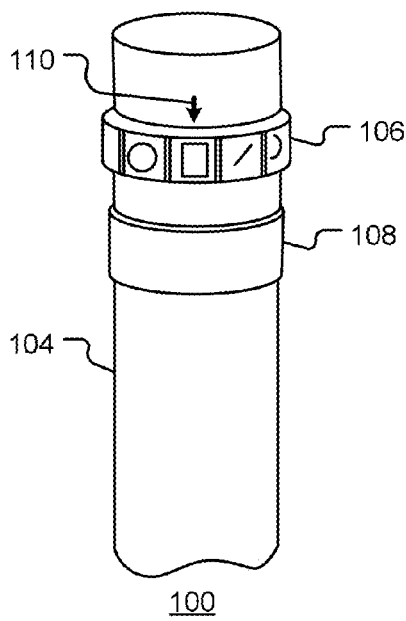

FIG. 8 shows a section of a further stylus body 104 having two control rings, 106 and 108. In this example, the selection ring 106 is used to select an object type, such as a square, circle, straight line or curved line, as indicated by the symbols on the ring. The second control ring, 108, is used to control a parameter of the object, such as the size of the square or circle, the angle of a line or the degree of smoothness of the curved line. The square drawing tool is selected in FIG. 8, as indicated by the alignment of the square symbol and the marker 110.

It will be apparent to those of ordinary skill in the art that other drawing tool properties may be controlled or selected using various combinations of selection rings and continuous control rings.

Figure 9:
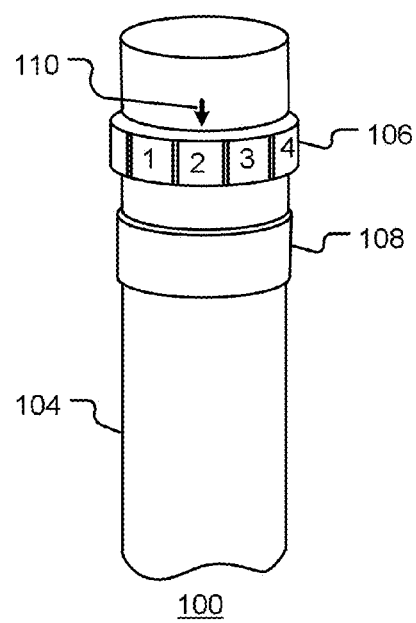

FIG. 9 shows a section of a further stylus body 104 having two control rings, 106 and 108. In this example, the selection ring 106 and the second control ring 108 are customizable by a user. Customization may be achieved by user interaction with a user interface on the host electronic device, for example. In one embodiment, when a particular number is selected on the selection ring 106, as indicated by alignment with marker 110, a menu for programming that number is made available on the user interface. This enables the user to associate a drawing tool parameter with the selected number on ring 106 and to select what value will be adjusted by the second control ring 108. For example. '2' might be programmed to correspond to a brush and the second control ring 108 might be programmed to adjust the brush width when '2' is selected.

In a further example, '2' might be programmed to correspond with a red pen of width 2 units, and the second control might be programmed to control the smoothness of a line drawn with the pen.

In one embodiment, the customization may be stored in a memory on the host electronic device, so that other styli may be used the host device. In a further embodiment, the customization may be stored in a memory on the stylus, so that the stylus may be used with other host electronic devices.

The body of the stylus may have substantially cylindrical section, with first and second control rings mounted on the cylindrical section of the body. A controller within the body generate a control signal dependent upon the first and second control rings, a transmitter transmits the control signal to a host electronic device. Information contained in the control signal may be used to control properties of a drawing tool in a computer drawing application.

In one embodiment, the first control ring is a color ring that is rotatable about the cylindrical section of the stylus body and the control signal controls the color of the drawing tool in the computer drawing application. The color ring may be coloured to indicate the color of the drawing tool in the computer drawing application. For example, the color ring may be coloured by red, orange, yellow, green, blue, indigo, violet and black.

A control ring may be a substantially continuous controller, such as a capacitive ring. The control signal may be dependent upon a touch position on the capacitive ring or a touch motion on the capacitive ring. For example, touch motion left-to-right may be used to increment a property value and motion right-to-left used to decrement a property value. Similarly, axial motion on the ring could be detected.

The first control ring may be used to select a property of the drawing tool in the computer drawing application and the second control ring used to control the value of a property in the computer drawing application.

In a further example embodiment, the first control rings controls the color of the drawing tool in the computer drawing application and the second control ring controls the drawing tool line width.

The transmitter of the stylus may be radio frequency transmitter that is operated under a standard protocol, such as a Bluetooth, WiFi or near field communication (NFC) protocol. Non-standard protocols may also be used.

A stylus may have three or more control rings mounted on the cylindrical section of the body, in which case the control signal is dependent upon all of the control rings.

The first control ring may be a multi-position switch that is used to select a property type, while the second control ring may be a substantially continuous control that is operable to select a value for the selected property type. In this case, the angular position of the first control ring relative to the stylus body is indicative of the selected property type.

The stylus communicates with a host electronic device that has a processor, a display screen and a communication receiver. The host electronic device is operable to execute a program of instructions of a drawing application. The host electronic device receives the control signal from the stylus and determines properties of a drawing tool in the drawing application dependent upon the control signal.

The stylus provides user input to the electronic device by generating first and second signals dependent upon operation of the first and second control rings on the stylus and then multiplexing the first and second signals to form a control signal. The control signal is transmitted from a transmitter of the stylus to a receiver of the host electronic device.

The control signal may include, for example, a header an identifier dependent upon the first signal; and a property value dependent upon the second signal.

When the first control ring is a color ring, the drawing tool color is determined from the angular position of the color ring relative to the stylus.

A control ring may be a substantially continuous control ring, such as a capacitive ring. In this embodiment, the capacitance of the capacitive ring is sensed to determine a drawing tool property value. Touch position or touch motion may be sensed.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

The circuits of the stylus and host electronic device may be implemented as programmed processors, or ASIC's, field programmable gate arrays or custom circuit, for example. Associated software module or components disclosed herein that execute instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both.

The present disclosure may be embodied in other specific forms without departing from its spirit or essential characteristics. The described example embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method for enabling selection of the attributes of a computerized drawing tool of a drawing application executed on a host electronic device, comprising:
    in response to operation of a first control ring on a stylus, generating a first signal representative of an angular position of the first control ring, where the first control ring comprises a multi-position selection switch having a plurality of angular positions, each angular position associated with a property of the computerized drawing tool property;
    in response to operation of a second control ring on the stylus, generating a second signal representative of a property value;
    multiplexing the first and second signals to form a control signal comprising:
        a header;
        an identifier dependent upon the first signal and comprising a numerical representation of the angular position of the first control ring; and
        a property value dependent upon the second signal and comprising a numerical representation of the property value; and
    transmitting the control signal from a transmitter of the stylus to enable selection, on the host electronic device, of a computerized drawing tool for which a property associated with the identifier has a value indicated by the property value.

2. A method in accordance with claim 1, wherein the identifier dependent upon the first signal comprises a tool identifier and a property identifier.

3. A method in accordance with claim 1, wherein the first control ring comprises a color ring, the method further comprising:
    determining the drawing tool color from the angular position of the color ring relative to the stylus.

4. A method in accordance with claim 1, wherein the second control ring comprises a capacitive ring, the method further comprising:
    sensing the capacitance of the capacitive ring; and
    determining a drawing tool property value of the drawing tool property from the capacitance of the capacitive ring.

5. A method in accordance with claim 4, wherein sensing the capacitance of the capacitive ring comprises: sensing a touch position on the capacitive ring.

6. A method in accordance with claim 5, wherein sensing the capacitance of the capacitive ring comprises: sensing touch motion on the capacitive ring.

7. A system comprising:
    a host electronic device comprising a processor, a display screen and a receiver, the host electronic device operable to execute a program of instructions of a drawing application; and
    a stylus comprising a body, a first control ring, a second control ring and a transmitter, where the first control ring selects a property of a drawing tool in the drawing application and the second control ring selects the value of the selected property in the drawing application;
    the stylus operable to transmit a control signal from the transmitter of the stylus in response to operation of the first and second control rings of the stylus, and
    the host electronic device operable to receive the control signal and to control the drawing tool in accordance with the control signal such that a property of the drawing tool selected by the first control ring of the stylus has the value selected by the second control ring of the stylus,
    wherein the control signal comprises:
        a header;
        an identifier comprising a numerical representation of an angular position of the first control ring; and
        a property value comprising a numerical representation of the property value selected by the second control ring.

8. A system in accordance with claim 7, wherein the first control ring comprises a color ring that is operable to select a color component dependent upon the angular position of the color ring relative to the body of the stylus, wherein the second control ring is operable to select a value of the color component selected by the color ring, and wherein the host electronic device is operable to set a drawing tool color dependent upon the selected value of the selected color component.

9. A system in accordance with claim 7, wherein a control ring of the first and second control rings comprises a capacitive ring, and wherein the control signal is dependent upon a touch position on the capacitive ring.

10. A system in accordance with claim 7, wherein a control of the first and second control rings comprises a capacitive ring, and wherein the control signal is dependent upon a touch motion on the capacitive ring.

11. A system in accordance with claim 7, wherein the host electronic device is further operable to provide a user interface operable to customize the response of the host electronic device to the control signal received from the stylus.

12. A stylus comprising:
    a body;
    a first control ring mounted on the body, the first control ring comprising a multi-position switch having a plurality of angular positions, each angular position associated with a property of a drawing tool of a computer drawing application;
    a second control ring mounted on the body, the second control ring operable to select a value of the property associated with an angular position of the first control ring;
    a controller, operable to generate a control signal responsive to operation of the first and second control rings; and
    a transmitter operable to transmit the control signal, the control signal containing information to enable selection of a drawing tool for which the selected property has the selected property value in the computer drawing application
    wherein the control signal comprises:
        a header:
        an identifier comprising a numerical representation of an angular position of the first control ring; and
        a property value comprising a numerical representation of the property value selected by the second control ring.

13. A stylus in accordance with claim 12, wherein the first control ring comprises a color ring that is rotatable about the stylus body to select a color component, wherein the second control ring is operable to select a value of the selected color component and wherein the control signal controls the color of the drawing tool in the computer drawing application.

14. A stylus in accordance with claim 13, wherein the color ring is colored to indicate the color of the drawing tool in the computer drawing application.

15. A stylus in accordance with claim 13, wherein the color ring is colored by one or more colors from the groups of colors consisting of red, orange, yellow, green, blue, indigo, violet and black.

16. A stylus in accordance with claim 12, wherein a control of the first and second control rings comprises a capacitive ring, and wherein the control signal is dependent upon a touch position on the capacitive ring.

17. A stylus in accordance with claim 12, wherein a control of the first and second control rings comprises a capacitive ring, and wherein the control signal is dependent upon a touch motion on the capacitive ring.

18. A stylus in accordance with claim 12, wherein the first control ring is operable to select between a color property of the drawing tool in the computer drawing application and a line thickness property of the drawing tool, and wherein the second control ring controls the drawing tool line width when the line thickness property is selected.

19. A stylus in accordance with claim 12, wherein the transmitter comprises a radio frequency transmitter operable under a protocol selected from the group of protocols consisting of a Bluetooth protocol, a WiFi protocol and a near field communication protocol.

20. A stylus in accordance with claim 12, further comprising:
at least one third control ring mounted on the body;
wherein the controller is operable to generate a control signal dependent upon the first and second control rings and dependent upon the at least one third control ring.

21. A stylus in accordance with claim 12, wherein the second control ring comprises a substantially continuous control that is operable to select a value for the selected property type.

* * * * *